(12) United States Patent
Sugino

(10) Patent No.: US 7,190,484 B2
(45) Date of Patent: Mar. 13, 2007

(54) CASH OPERATED IMAGE FORMING APPARATUS AND ITS CONTROL METHOD

(75) Inventor: Kazumasa Sugino, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 897 days.

(21) Appl. No.: 09/793,097

(22) Filed: Feb. 27, 2001

(65) Prior Publication Data

US 2001/0028465 A1    Oct. 11, 2001

(30) Foreign Application Priority Data

| Feb. 29, 2000 | (JP) | ............................ 2000-052918 |
| Feb. 29, 2000 | (JP) | ............................ 2000-052920 |
| Feb. 29, 2000 | (JP) | ............................ 2000-052955 |
| Feb. 26, 2001 | (JP) | ............................ 2001-050973 |
| Feb. 26, 2001 | (JP) | ............................ 2001-050974 |
| Feb. 26, 2001 | (JP) | ............................ 2001-050975 |

(51) Int. Cl.
    *G06F 15/00* (2006.01)
    *G06K 15/00* (2006.01)
(52) U.S. Cl. ...................................... 358/1.9; 358/1.14
(58) Field of Classification Search ................. 358/1.1, 358/1.8, 1.9, 1.12, 1.13, 1.15, 1.17, 1.18, 358/448; 380/201, 203; 707/10, 100; 709/201, 709/238
See application file for complete search history.

(56) References Cited

U.S. PATENT DOCUMENTS

| 6,168,325 B1 * | 1/2001 | Nagata ................... 400/120.01 |
| 6,452,689 B1 * | 9/2002 | Srinivasan ................ 358/1.15 |
| 6,583,888 B1 * | 6/2003 | Salgado et al. ............ 358/1.15 |

\* cited by examiner

*Primary Examiner*—Gabriel I. Garcia
(74) *Attorney, Agent, or Firm*—Fitzpatrick, Cella, Harper & Scinto

(57) ABSTRACT

A copy charging system can be applied to an image processing apparatus having a function for printing data such as PDL data or the like. When a specific function is selected from a plurality of output functions, data which is outputted by another function is prevented from being outputted. A fact that the user is present near the apparatus is discriminated by payment of a fee. When the fee is paid, data is enabled to be received. Upon both-side outputting, unless a fee for both sides is paid, even a single-side output is not performed.

13 Claims, 10 Drawing Sheets

CASH OPERATED IMAGE FORMING APPARATUS AND ITS CONTROL METHOD

BACKGROUND OF THE INVENTION

1. Field of the Invention

The invention relates to an image forming apparatus and its control method.

2. Related Background Art

In association with the digitalization of copying apparatuses, a hybrid apparatus having a plurality of functions such as facsimile function for performing facsimile transmission and reception by using a scanner function, a printer function, PDL (Page Description Language) printer function, and the like has been put into practical use. Such a hybrid apparatus can operate not only as a single function such as copy function, facsimile function, PDL printer function, or the like, but also among a plurality of functions, such that a PDL developed image is facsimile transmitted and the like. Further, by connecting the hybrid apparatus via a LAN, the functions of the hybrid apparatus can be used by computer apparatuses and the like.

In a copying apparatus, an apparatus having a function for performing a charging process in accordance with a paper size of a copied image, a kind of paper, the number of papers, color/monochrome, or the like has been put into practical use. In such a copying apparatus, the user can set a copy irrespective of whether sufficient coins have been inserted or not, and a control, such that the copying operation is not started or interrupted if the coins are insufficient at a stage where the copy is actually executed in accordance with the setting, is performed.

If a charging system of the coin throw-in type in the same format is applied to a PDL printer or a hybrid apparatus having a PDL printer function, there are the following problems.

If print data can be sent from a computer before the coins are thrown in, another user cannot use such an apparatus until coins are thrown in.

Even if there is not the user who wants to use the apparatus, the received data has to be stored until coins are thrown in. This results in an increase in capacity of a memory and becomes a cause of an increase in costs. A timing control of erasure of data and the like also have to be performed and the control becomes complicated.

In case of a copy, unless a necessary amount of money is paid, an original is not read. In case of the PDL printer function, however, a necessary amount of money is unknown until data is received and analyzed. Therefore, when data of a plurality of pages is received in a lump, there is a possibility that the amount of money paid by the user is insufficient before all of the data which has already been received is printed. However, such a situation is not presumed in the charging system of the coin throw-in type used in the conventional copying apparatus.

During the printing of the data of a plurality of pages, if the printing cannot be performed at the halfway due to convenience of an amount of money or the like possessed by the user and there is data remaining in the hybrid apparatus that has not been printed, there is a fear that when another user intends to copy by using the copy function and throws coins into the apparatus, the remaining data is outputted as unpreferable data.

In a state where the user forgets removing an original and there is a copy original on a copyboard, if another user intends to print by using the printer function, throws coins into the apparatus, and presses a start key, there is also a fear that a copy of the original on the copyboard is outputted as unpreferable data.

In the conventional copying apparatus, since the originals are read one by one (every single side) in a both-side copying mode, each time a single side is printed, a process is interrupted and the copy is executed while charging. The reason why there is no trouble even if the printing to a single side is interrupted mainly at the time of a platen as mentioned above is because the user himself who requested the both-side printing performs the printing by throwing coins while perceiving the progress of the operation.

In case of the PDL data, in the both-side printing mode, since the printing of the data for both sides is requested in a lump, the charging process of the conventional copying apparatus which performs the charging process every single side cannot be used as it is in common.

That is, if only the data for a single side is printed due to an insufficient fee (coins) or the like in spite of a fact that the data for both sides has been received, a complicated process is requested of the user. For example, when the user sends data for two pages, if only a single side is printed, in order to print the second side, the user has to edit the data and send the data of only the second side again.

As mentioned above, if the conventional copy charging system of the coin throw-in type is applied to the PDL printer or the hybrid apparatus having the PDL printer function, there are various problems.

SUMMARY OF THE INVENTION

It is an object of the invention to enable a copy charging system to be applied also to an image processing apparatus having a function for print outputting data such as PDL data or the like.

Another object of the invention is to enable payment of a fee to a coin receiving unit or the like to be recognized and to enable an image forming apparatus having a printer function to be properly and efficiently controlled.

Another object of the invention is to prevent the data which is not desired by the user from being outputted.

Still another object of the invention is to reduce a load on the user in case of both-side printing the transferred data.

The above and other objects and features of the present invention will become apparent from the following detailed description and the appended claims with reference to the accompanying drawings.

DETAILED DESCRIPTION OF THE PREFERRED EMBODIMENTS (First Embodiment)

A preferred embodiment of the invention will now be described hereinbelow with reference to the drawings.

Figure 1:
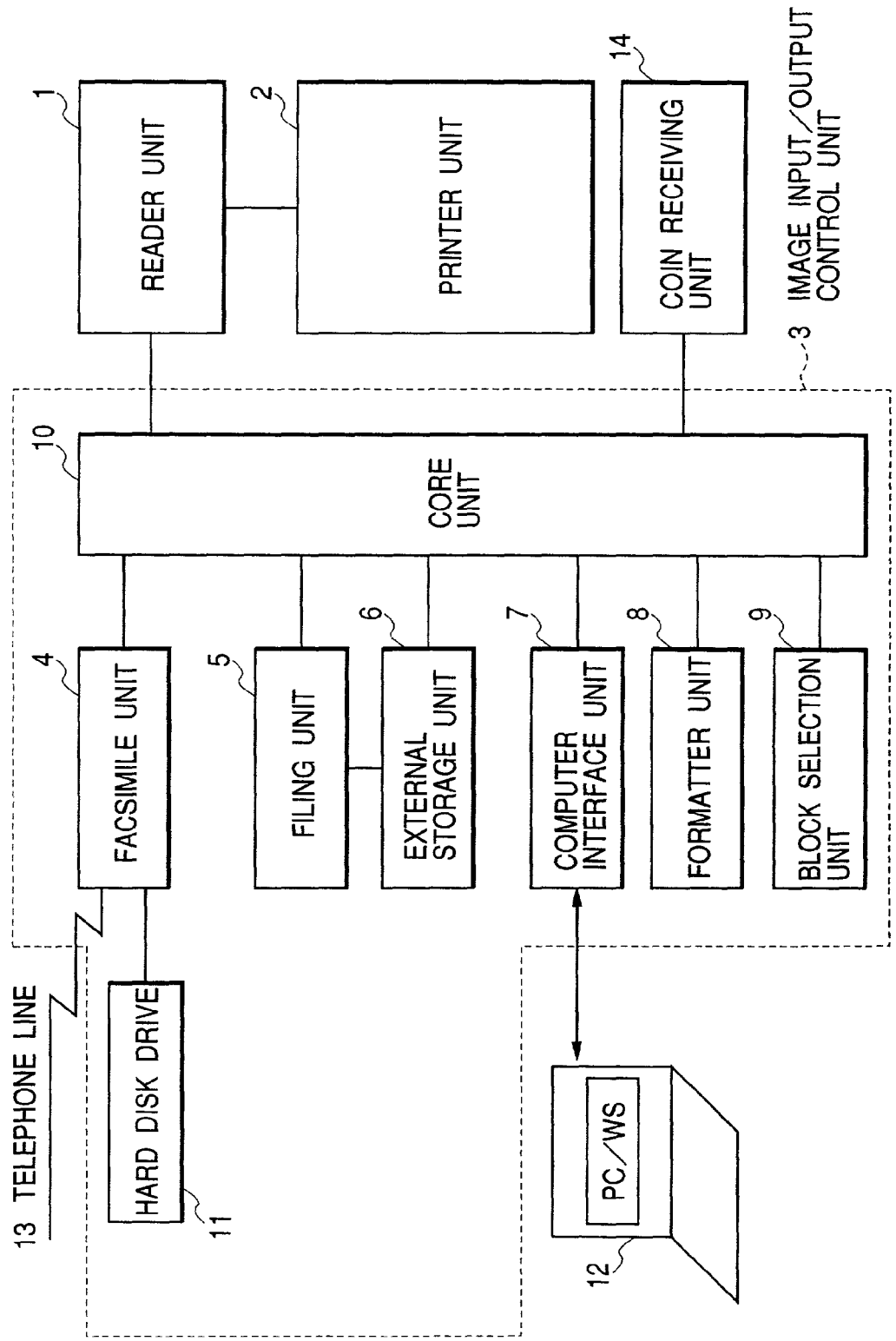
FIG. 1 is a block diagram of an image processing apparatus in an embodiment of the invention.

FIG. 1 is a block diagram showing a construction of an image processing apparatus of the embodiment. In the diagram, a reader unit 1 reads an image of an original and outputs image data corresponding to the original image to a printer unit 2 and an image input/output control unit 3. The printer unit 2 records an image corresponding to the image data from the reader unit 1 and image input/output control unit 3 onto a recording paper. The image input/output control unit 3 is connected to the reader unit 1 and includes a facsimile unit 4, a filing unit 5, a computer interface unit 7 for a network, a formatter unit 8, a block selection unit 9, a core unit 10, and the like.

The facsimile unit 4 decompresses compressed image data received through a telephone line 13 and transfers the decompressed image data to the core unit 10. The facsimile unit 4 also compresses the image data transferred from the core unit 10 and transmits the compressed image data through the telephone line 13. A hard disk drive 11 is connected to the facsimile unit 4 and can temporarily store the received compressed image data.

An external storage unit, namely, a magneto-optical disk drive unit 6 is connected to the filing unit 5. The filing unit 5 compresses the image data transferred from the core unit 10 and stores the image data onto a magneto-optical disk set in the magneto-optical disk drive unit 6 together with a keyword for searching the image data. The filing unit 5 searches the compressed image data stored on the magneto-optical disk on the basis of the keyword transferred through the core unit 10, reads out the searched compressed image data, decompresses it, and transfers the decompressed image data to the core unit 10.

The computer interface unit 7 is an interface between a personal computer or workstation (PC/WS) 12 and the core unit 10 and supports networks in a range from a serial basic interface or the like to the LAN (Local Area Network). As a network function, a protocol such as Netware, TCP/IP, Ether Talk, or the like is supported on the serial (SLIP) or LAN and services of an upper layer such as NFS or the like are also supported.

The formatter unit 8 develops code data indicative of an image transferred from the PC/WS 12 into image data which can be recorded by the printer unit 2.

The block selection unit 9 stores the image data, analyzes the stored image data, classifies it into a text portion and an image portion, and manages the classified data and its layout information so as to be concerned with each other.

Although the core unit 10 will be explained hereinlater, the core unit 10 controls a flow of data between the respective reader unit 1, facsimile unit 4, filing unit 5, computer interface unit 7, formatter unit 8, block selection unit 9, and a coin receiving unit 14.

The coin receiving unit 14 notifies the core unit 10 of an amount of coins thrown in by the user. If the coin receiving unit 14 manages a fee regarding monochrome/color, information regarding whether a monochrome/color printing can be performed or not, the number of printable copies in each of the monochrome/color printing modes, and the like. The core unit 10 receives a notification from the coin receiving unit 14 and, thereafter, activates a screen or executes the printing operation.

Figure 2:
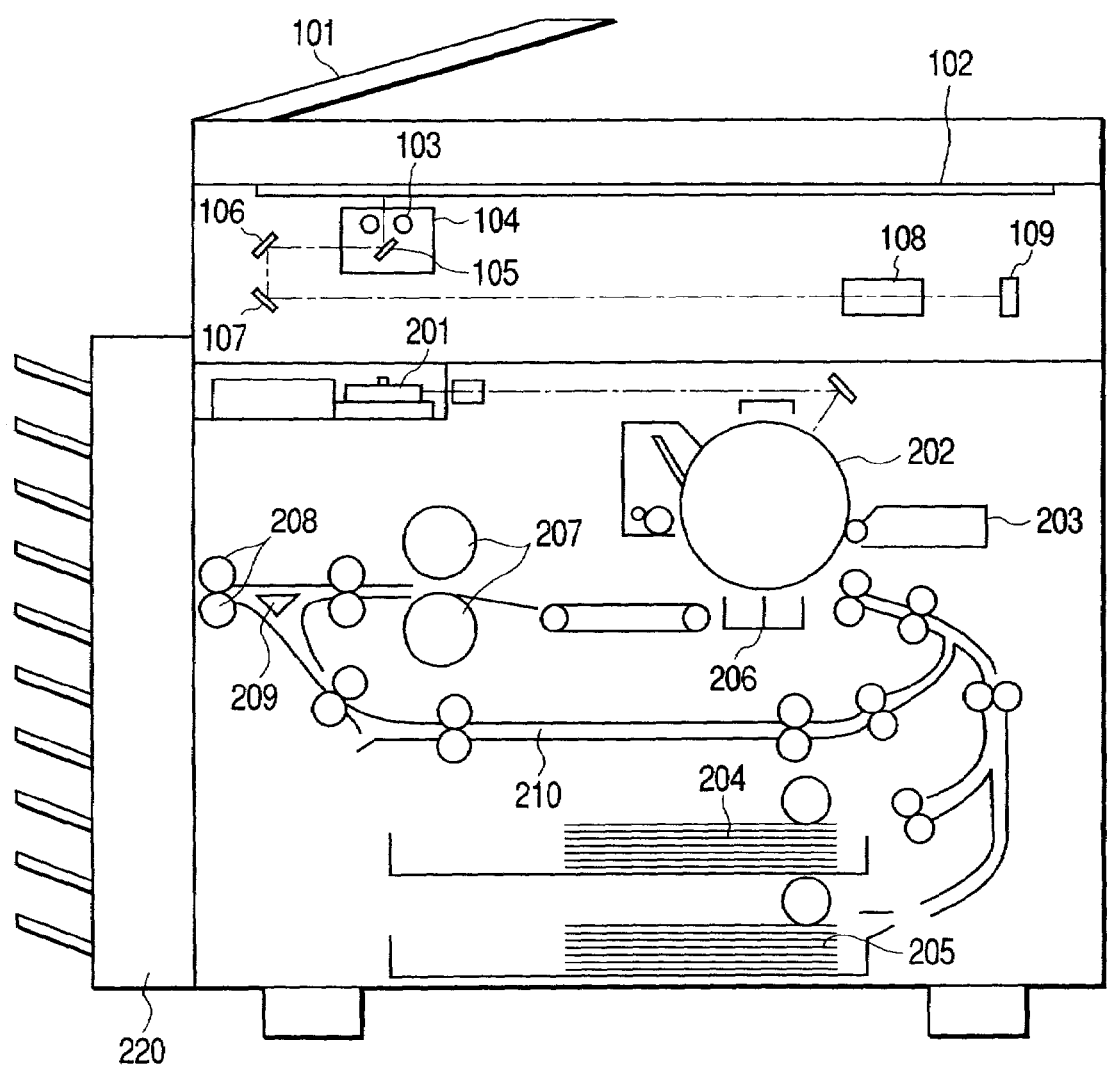
FIG. 2 is a cross sectional view of a reader unit and a printer unit in the embodiment of the invention.

FIG. 2 is a cross sectional view showing a construction of the reader unit 1 and printer unit 2. A document feeder 101 of the reader unit 1 feeds the originals one by one in order from the last page onto a platen glass 102. After completion of the reading operation of the original, the original is delivered onto the platen glass 102. When the original is conveyed onto the platen glass 102, a lamp 103 is turned on, the movement of a scanner unit 104 is started, and the original is exposed and scanned. Reflection light from the original at this time is guided to a CCD image sensor (hereinafter, abbreviated to CCD) 109 by mirrors 105, 106, and 107 and a lens 108.

The image of the original scanned as mentioned above is read by the CCD 109. The image data which is outputted from the CCD 109 is subjected to predetermined processes and, thereafter, the processed image data is transferred to the printer unit 2 and the core unit 10 of the image input/output control unit 3.

A laser driver 221 of the printer unit 2 drives a laser emitting unit 201 and allows the laser emitting unit 201 to emit a laser beam according to the image data outputted from the reader unit 1. The laser beam is irradiated onto a photosensitive drum 202, so that a latent image according to the laser beam is formed on the photosensitive drum 202. A developing agent is adhered to the latent image portion on the photosensitive drum 202 by a developing unit 203. The recording paper is fed out from either a cassette 204 or 205 at a timing synchronized with the start of irradiation of the laser beam and conveyed to a transfer unit 206. The developing agent adhered on the photosensitive drum 202 is transferred onto the recording paper. The recording paper on which the developing agent has been transferred is conveyed to a fixing unit 207. The developing agent is fixed onto the recording paper by heat and pressure of the fixing unit 207.

The recording paper which passed through the fixing unit 207 is delivered by delivery rollers 208. A sorter 220 encloses the delivered recording papers onto each bin, thereby sorting the recording papers. When a sorting mode is not set, the sorter 220 sorts the recording papers onto the top bin. When the both-side recording mode is set, the recording paper is conveyed to the delivery rollers 208 and, thereafter, the rotating direction of the delivery rollers 208 is reversed, thereby guiding the recording paper to a direction of the delivery rollers 208 is reversed, thereby guiding the recording paper to a paper refeed conveying path 210 by a flapper 209. When a multiple recording mode is set, the recording paper is guided to the paper refeed conveying path 210 by the flapper 209 50 as not to convey it to the delivery rollers 208. The recording paper guided to the paper refeed conveying path 210 is fed to the transfer unit 206 at the timing mentioned above.

Figure 3:
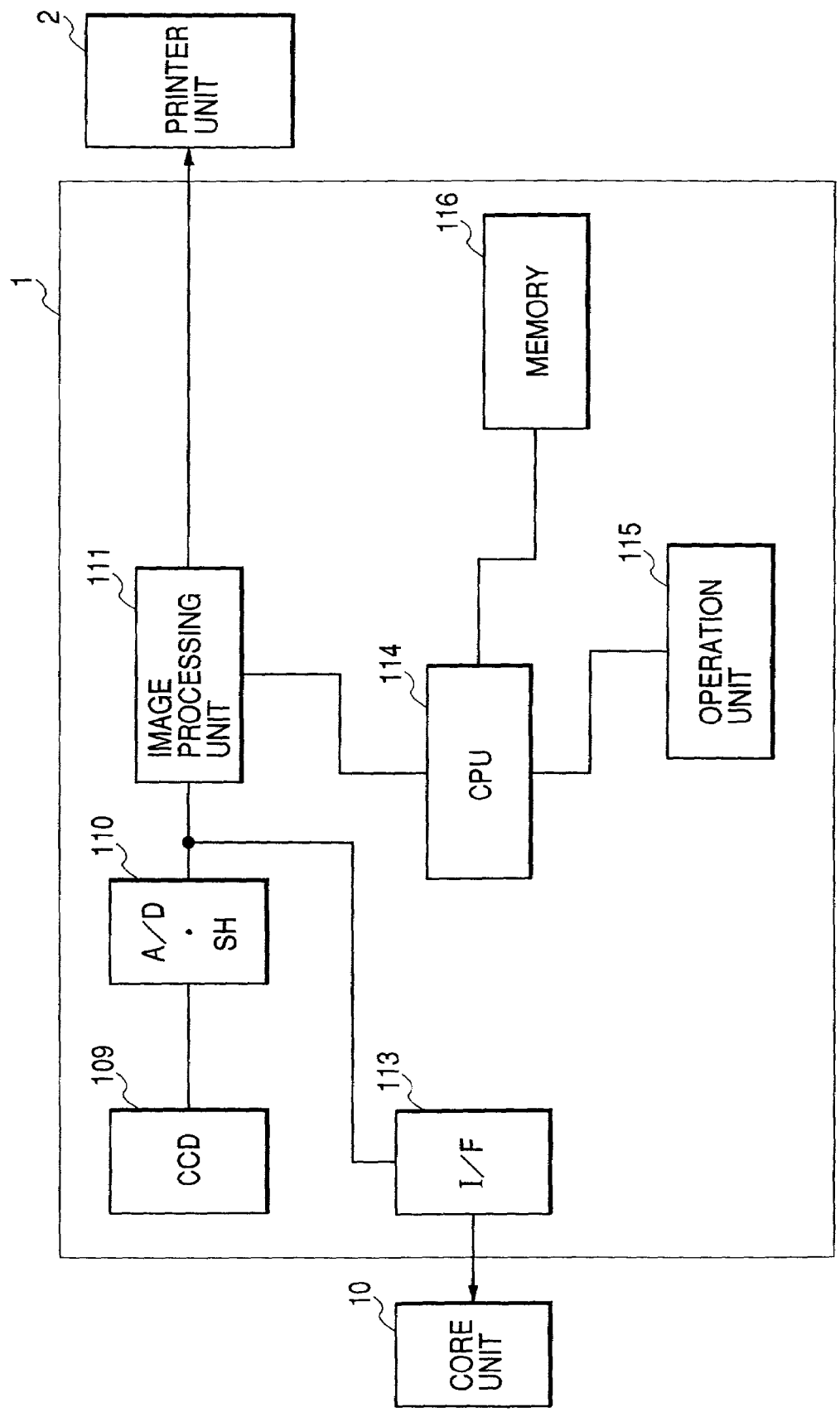
FIG. 3 is a block diagram of the reader unit in the embodiment of the invention.

FIG. 3 is a block diagram showing an example of a construction of the reader unit 1. In FIG. 3, the analog image data outputted from the CCD 109 is converted into the digital signal by an A/D·SH unit 110 and subjected to a shading correction. The image data processed by the A/D·SH unit 110 is transferred to the printer unit 2 through an image processing unit 111 and transferred to the core unit 10 of the image input/output control unit 3 through an interface 113.

A CPU 114 controls the image processing unit 111 and interface 113 in accordance with the setting contents set by an operation unit 115. For example, when a copy mode to perform a trimming process and a copy is set by the operation unit 115, the trimming process is executed in the image processing unit 111 and the processed data is transferred to the printer unit 2. When a facsimile transmitting mode is set by the operation unit 115, the image data and a control command according to the set mode are transferred from the interface 113 to the core unit 10. Such a control program of the CPU 114 has been stored in a memory 116. The CPU 114 performs the control with reference to the program in the memory 116. The memory 116 is also used as a work area of the CPU 114.

Figure 4:
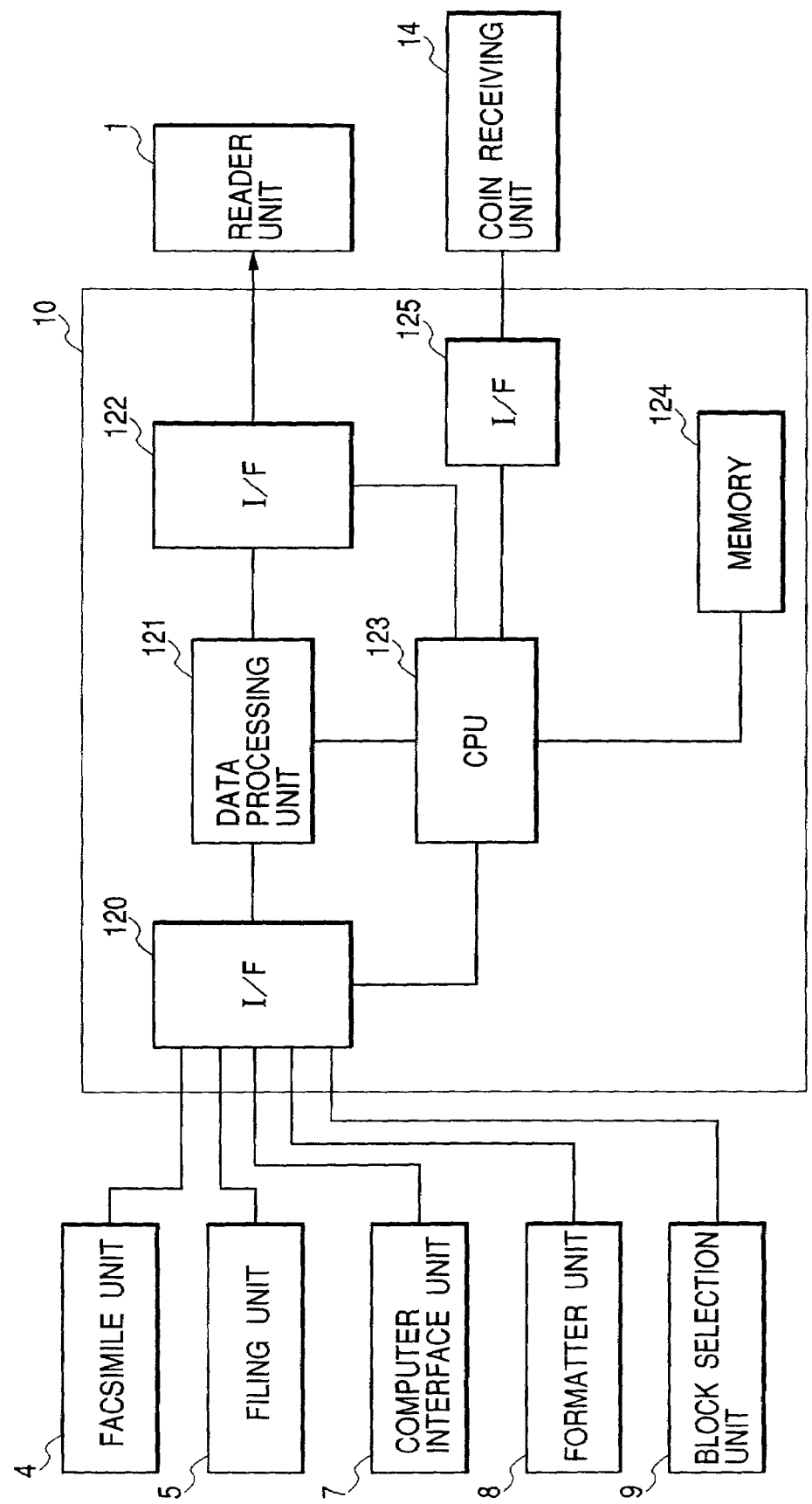
FIG. 4 is a block diagram of a core unit in the embodiment of the invention.

FIG. 4 is a block diagram showing an example of a construction of the core unit 10. In FIG. 4, the image data from the reader unit 1 is transferred to a data processing unit 121 through an interface 122. A control command of the reader unit 1 is transferred to a CPU 123 through the interface 122. The data processing unit 121 executes image processes such as a rotating process, a zooming process, and the like of the image. The image data transferred from the reader unit 1 to the data processing unit 121 is transferred to the facsimile unit 4, filing unit 5, and computer interface unit 7, through an interface 120, in response to the control command transferred from the reader unit 1.

Code data indicative of the image inputted through the computer interface unit 7 is transferred to the data processing unit 121 and, thereafter, transferred to the formatter unit 8 and developed into the image data. The image data is transferred to the data processing unit 121 and, thereafter, transferred to the facsimile unit 4 and printer unit 2. The image data from the facsimile unit 4 is transferred to the data processing unit 121 and, thereafter, transferred to the printer unit 2, filing unit 5, and computer interface unit 7. The image data from the filing unit 5 is transferred to the data processing unit 121 and, thereafter, transferred to the printer unit 2, facsimile unit 4, and computer interface unit 7.

The information from the coin receiving unit 14 is transferred to the CPU 123 through an interface 125.

The CPU 123 performs the control in accordance with a control program stored in a memory 124 and the control command transferred from the reader unit 1. The memory 124 is also used as a work area of the CPU 123. As mentioned above, it is possible to execute the processes in which the functions such as reading of the original image, printing of the image, transmission and reception of the image, storage of the image, input/output of the data to/from the computer, and the like are combined around the core unit 10.

Figure 5:
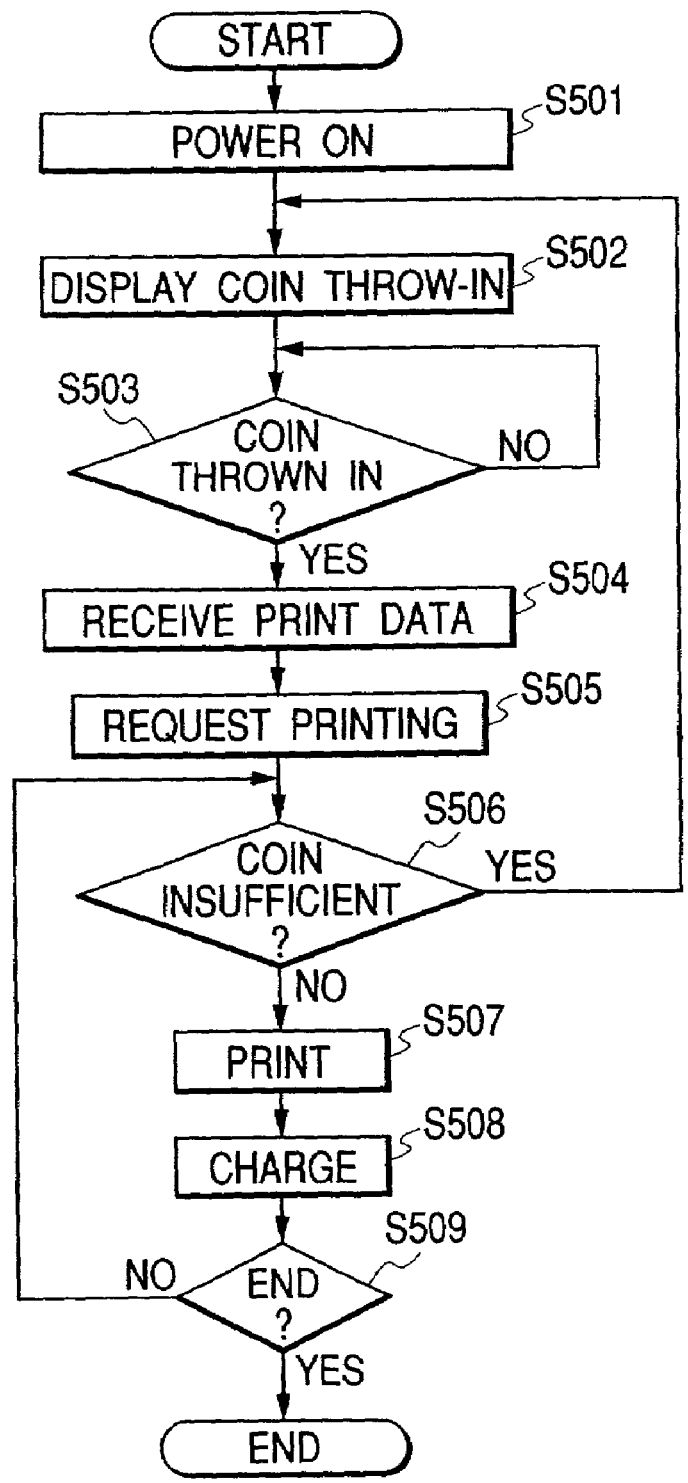
FIG. 5 is a flowchart showing an example of the operation of a charging system in the first embodiment of the invention.

Subsequently, FIG. 5 shows a flow for a charging system of a digital hybrid apparatus in the embodiment. A case where the printer function has been selected in the digital hybrid apparatus in the embodiment will now be described hereinbelow. A case where another function is selected will be described in the second embodiment, which will be explained hereinlater.

In step S501 in FIG. 5, the ordinary copy activating operation is executed under the control of the core unit 10 at the time of turn-on of a power source. Although an initializing process is executed for the formatter unit 8 (PDL), the control mode is not shifted to a mode in which the PDL (Page Description Language) data from the PC/WS 12 can be received, but is kept in a state where the PDL data is not received by setting the mode into a print standby mode.

Figure 6:
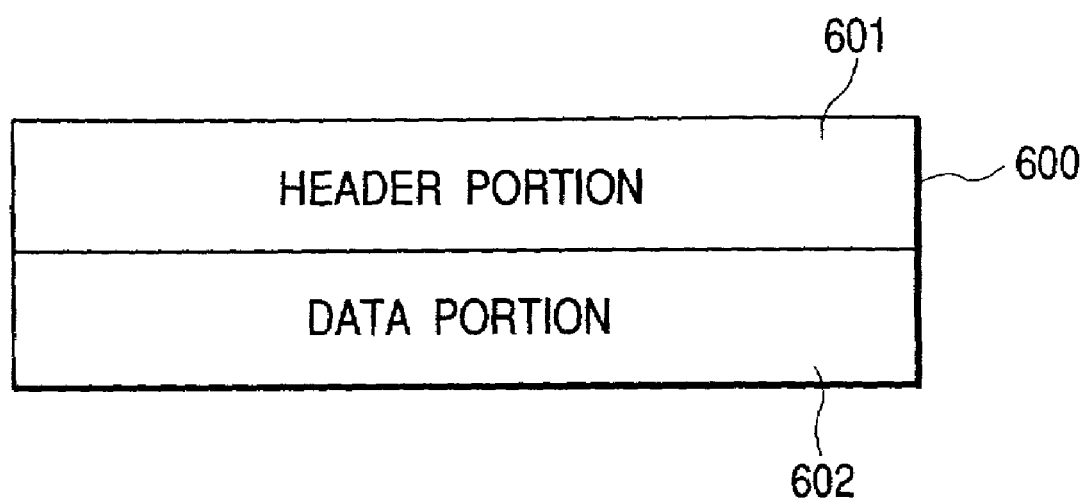
FIG. 6 is a diagram showing a logical structure of PDL data in the embodiment of the invention.

PDL data 600 has a logical structure as shown in FIG. 6. In FIG. 6, reference numeral 601 denotes a header portion showing information regarding a description language (LIPS), a paper size, an output mode such as single side/both sides or the like, the number of print copies, and the like. Reference numeral 602 denotes print data written by the description language shown in the header portion 601. There is also a case where data for a plurality of pages has been written.

Returning to FIG. 5, in step S502, a coin throw-in picture plane is displayed by the operation unit 115 at a point when the set-up of all component elements has been completed.

In step S503, if coins have been thrown into the coin receiving unit 14, step S504 follows. If no coin is thrown in, the processing routine is returned to step S503. In step S503, the number of coins (fee) which is necessary for printing is not discriminated but whether the coins have been thrown in or not is discriminated. This process is performed to discriminate whether the user who intends to print exists near the hybrid apparatus or not. Therefore, if the coins have been thrown in in step S503, it is regarded that the user exists near the apparatus, so that the processes in step S504 and subsequent steps are executed.

In step S504, the core unit 10 receives a notification of the coin throw-in from the coin receiving unit 14 and turns on a print ready signal. In response to this signal, the formatter unit 8 (PDL) is enabled to receive the PDL data.

In step S505, the PDL data is transferred from the PC/WS 12 to the formatter unit 8 via the computer interface unit 7 and actually developed by the operation of the PC/WS 12 or the operation of the operation unit 115. By interpreting the header portion 601, the output mode (monochrome/color, paper size, resolution, single side/both sides, etc.) is clarified and notified to the core unit 10.

In step S506, a calculation of a fee necessary for printing the first side is executed by the same method as the charging method of the copy on the basis of the output mode determined in step S505. If an amount of money thrown into the coin receiving unit 14 is sufficient, step S507 follows. If it is insufficient, the processing routine is returned to step S502.

In step S507, the print data is sent from the formatter unit 8 to the core unit 10 and the printing is actually executed. In step S508, an actual charging process such that the fee for the printed originals is subtracted from the fee of money thrown into the coin receiving unit 14 or the like is executed.

In step S509, whether there is a page which is not printed yet in the data developed in step S505 or not is discriminated. If the printing of all pages has been completed, the processing routine is finished. If there are still pages to be printed, the processing routine is returned to step S506. The remaining pages are printed in steps S506, S507, and S508.

According to the embodiment as described above, the copy charging system can be used in the image forming apparatus having the printer function.

Particularly, when the amount of money is insufficient, a logic of the copy with positive achievements can be used in common, so that an extremely high affinity for the user can be assured.

By recognizing the payment of the amount of money irrespective of the paid amount of money, a fact that the user exists near the apparatus is recognized. Therefore, the reception control of the data can be performed at the optimum timing.

If the paid amount of money is insufficient, even during the output of the data which has already been received, it can be interrupted at the halfway.

(Second Embodiment)

Since an image processing apparatus in the second embodiment is also similar to that in FIGS. 1 to 4 described in the first embodiment, its detailed description is omitted.

A flow of a charging system of a digital hybrid apparatus in the embodiment will now be described hereinbelow with reference to FIG. 7.

Figure 7:
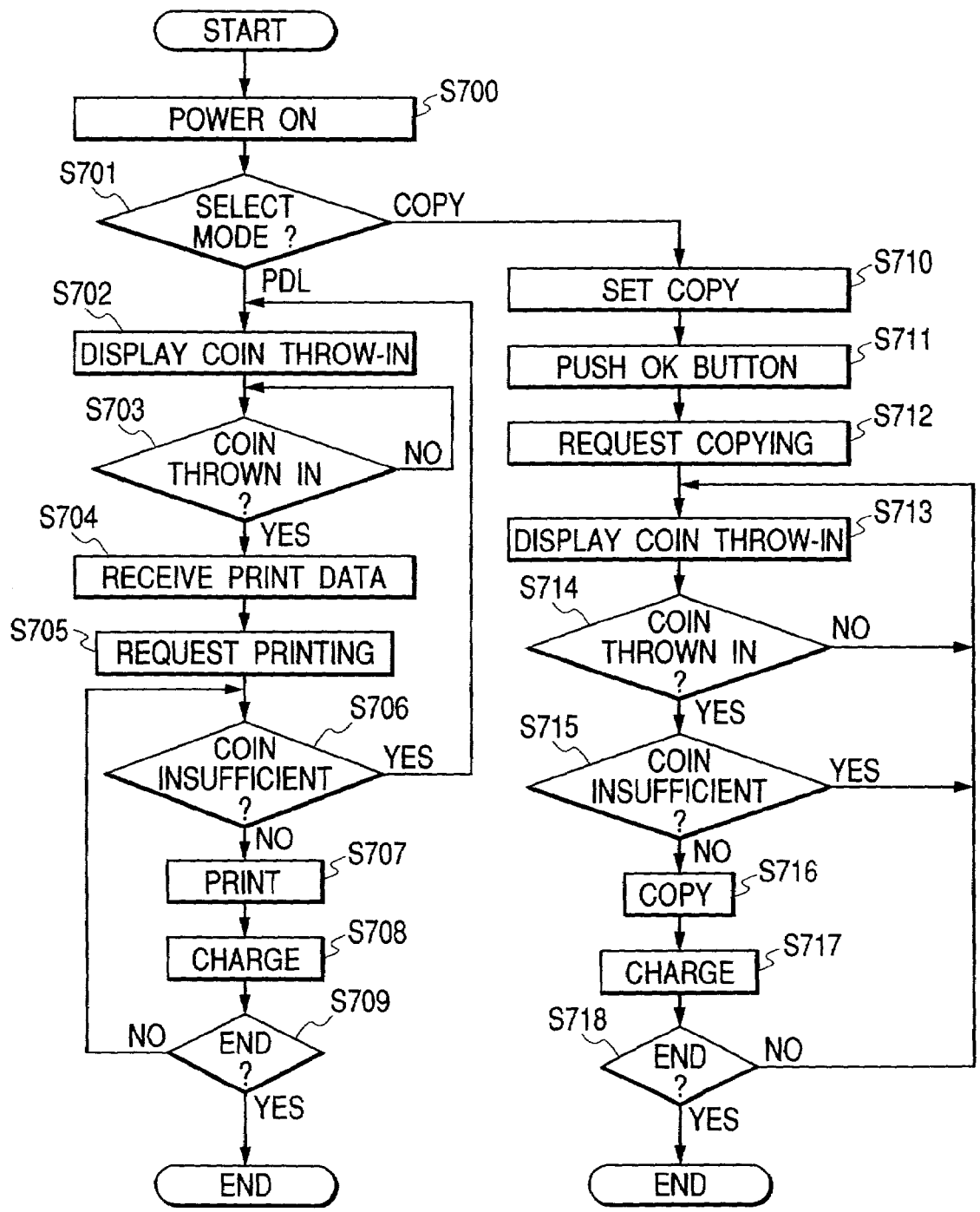
FIG. 7 is a flowchart showing an example of the operation of a charging system in a second embodiment of the invention.

In step S700 in FIG. 7, the ordinary copy activating operation is executed under the control of the core unit 10 at the time of turn-on of a power source. Although an initializing process is executed for the formatter unit 8 (PDL), the control mode is not shifted to a mode in which the PDL (Page Description Language) data from the PC/WS 12 can be received, but is kept in a state where the PDL data is not received by setting the mode into a print standby mode.

The PDL data 600 has the logical structure as shown in FIG. 6. In FIG. 6, reference numeral 601 denotes the header portion showing information regarding the setting of the description language (LIPS), paper size, output mode such as single side/both sides or the like, the number of print copies, and the like. Reference numeral 602 denotes the print data written by the description language shown in the header portion 601. There is also a case where data for a plurality of pages has been written.

Figure 8:
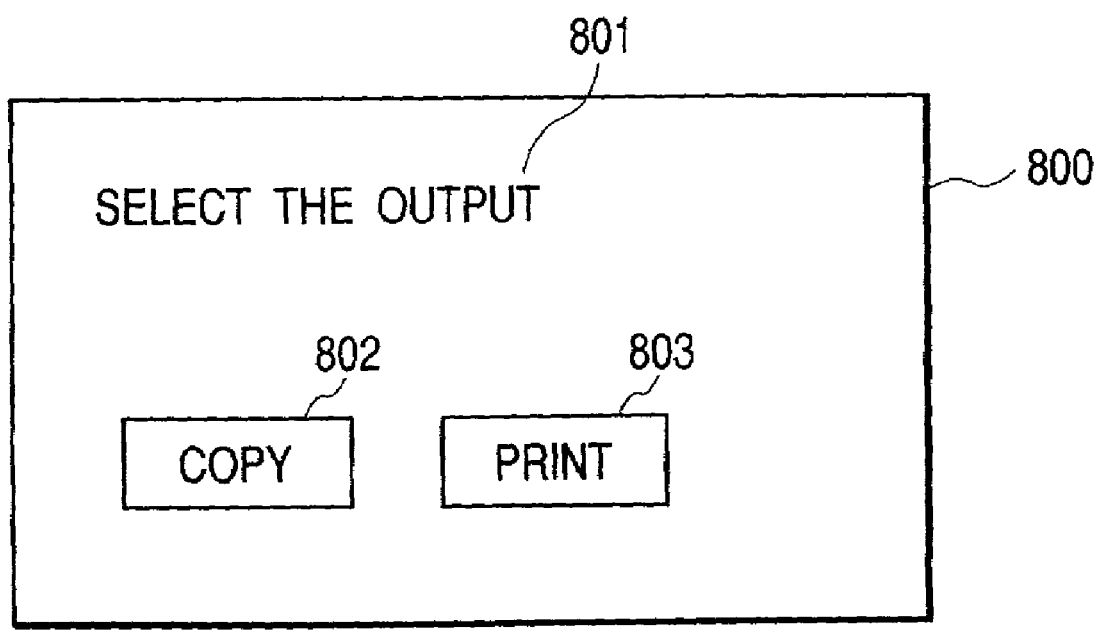
FIG. 8 shows a display example upon function selection in the second embodiment of the invention.

In step S701, as shown in FIG. 8, a message 801 to prompt the operation unit 115 to select the mode, an operation button 802 to select the copy function, and an operation button 803 to select the printer function of the PDL data are displayed and a picture plane to select one of the functions is displayed. When the printer function is selected, step S702 follows. When the copy function is selected, step S710 follows. Although a state where the copy function and printer function can be selected is shown in FIG. 8, it is also possible to display the other functions such as a facsimile function and the like and enable them to be selected.

In step S702, the coin throw-in picture plane is displayed on the operation unit 115 at a point when all of the setup processes are completed. In this case, the output in the non-selected copy function is guarded, thereby preventing that the copy of the original in the document feeder or on the platen glass (hereinafter, referred to as "on the copyboard") is erroneously outputted.

In step S703, if the coins are thrown into the coin receiving unit 14, step S704 follows. If NO, the processing routine is returned to step S703. In step S703, the number of coins (fee) necessary for printing is not discriminated but whether the coins have been thrown in or not is discriminated. This judgment is made to discriminate that the user who intends to print exists near the hybrid apparatus. Therefore, if the coins were thrown in in step S703, it is regarded that the user exists near the apparatus. The processes in step S704 and subsequent steps are executed.

In step S704, the core unit 10 receives a notification of the coin throw-in from the coin receiving unit 14 and turns on the print ready signal. In response to this signal, the formatter unit 8 (PDL) is enabled to receive the PDL data. Although the formatter unit 8 is enabled to receive the PDL data when the coins are thrown into the coin receiving unit 14 here, it is also possible to enable the formatter unit 8 to receive the PDL data when the printer function is selected in step S701. This is because it is possible to discriminate that the user who intends to print exists near the hybrid apparatus at a point when the printer function is selected by the operation unit 115. In step S705, the PDL data is transferred from the PC/WS 12 to the formatter unit 8 via the computer interface unit 7 and actually developed by the operation of the PC/WS 12 or the operation of the operation unit 115. By interpreting the header portion 601, the core unit 10 is notified of the output mode (monochrome/color, paper size, resolution, single side/both sides).

In step S706, a calculation of a fee necessary for printing the first side is executed by the same method as the charging method of the copy on the basis of the output mode determined in step S705, that is, on the basis of the output mode of the printer function of the PDL data. If the amount of money thrown into the coin receiving unit 14 is sufficient, step S707 follows. If it is insufficient, the processing routine is returned to step S702.

In step S707, the print data is sent from the formatter unit 8 to the core unit 10 and the printing is actually executed. In step S708, an actual charging process such that the fee for the printed originals is subtracted from the fee of money thrown into the coin receiving unit 14 is executed at a point of the print completion.

In step S709, whether there is a page which is not printed yet in the data developed in step S705 or not is discriminated. If the printing of all pages has been completed, the processing routine is finished. If there is the page to be printed, the processing routine is returned to step S706. The remaining pages are printed in steps S706, S707, and S708.

As described above, when the printer function is selected in step S701, even if the original is put on the copyboard, it is possible to prevent the copying operation from being started.

When the copy function is selected in step S701, the apparatus is guarded lest the data other than the data of the original read by the reader unit 1 (that is, the data other than the copy function such as data which has been developed by the formatter unit 8 upon selection of the printer function and remained and stored in the memory without being printed) is inputted from the core unit 10 and erroneously printed. In step S710, a copy setting (monochrome/color, paper size, resolution, single side/both sides) is displayed to the operation unit 115. In step S711, when the copy setting is performed and the operation to start the copy (push an OK button (not shown) or the like) is executed, step S712 follows. The set output mode is sent from the reader unit 1 to the core unit 10. The core unit 10 calculates a copy fee of one original on the basis of the decided output mode. In step S713, the calculated copy fee and the coin throw-in picture plane are displayed to the operation unit 115.

If it is determined in steps S714 and S715 that the fee necessary for copying at least one sheet of original in the set output mode has been thrown in on the basis of the notification from the coin receiving unit 14, the core unit 10 turns on the print ready signal. In step S716, the original on the copyboard is read and the process to print the read image by the printer unit 2 is started.

In step S717, the actual charging process such that the fee for the printed originals is subtracted from the fee of money thrown into the coin receiving unit 14 or the like is executed.

In step S718, whether the original which is not copied yet exists on the copyboard or not is discriminated. If there is the unprocessed original, the processing routine is returned to step S713 and a process for copying the remaining originals is executed. If NO, the processing routine is finished.

It is assumed that the throw-in of coins into the coin receiving unit 14 can be performed before the coin throw-in is displayed after the selection of the copy function. In this case, as a fee to be displayed, the fee obtained by subtracting the fee necessary for printing from the fee which has already been thrown in (that is, the fee necessary for starting the printing) can be displayed, or both of the necessary fee and the fee necessary for printing one sheet of original can be displayed.

As mentioned above, when the copy function is selected in step S701, even if the print data upon selection of the printer function remains in the memory or the like, it is possible to prevent the print data from being erroneously printed.

According to the embodiment as mentioned above, it is possible to prevent the data which has to be outputted by the function other than the selected function from being erroneously outputted. Therefore, a misprinting in an environment such that various users use the same apparatus can be prevented.

According to the embodiment, therefore, the copy charging system can be used in the image forming apparatus having the copy function and the printer function.

Particularly, the erroneous output of the data can be easily and certainly prevented by managing the operations in the sequence process of each of the copy function and the printer function. For example, it is possible to prevent a situation such that when the print data of PDL or the like remains in the apparatus without being printed, even though the copy user has thrown coins in the coin receiving unit, the print data which was left by the previous user is erroneously printed. It is also possible to prevent a situation in which the original on the copyboard is copied, even if the original for copying is left on the copyboard or the print user has thrown coins in the coin receiving unit.

(Third Embodiment)

Since an image processing apparatus in the third embodiment is also similar to that in FIGS. 1 to 4 described in the first embodiment, its detailed description is omitted.

A flow of a charging system of a digital hybrid apparatus in the embodiment will now be described hereinbelow with reference to FIGS. 9 and 10. An explanation will be made with respect to a case where the printer function is selected in the digital hybrid apparatus in the embodiment. The case where the other function is selected is similar to that in the second embodiment mentioned above.

Figure 9:
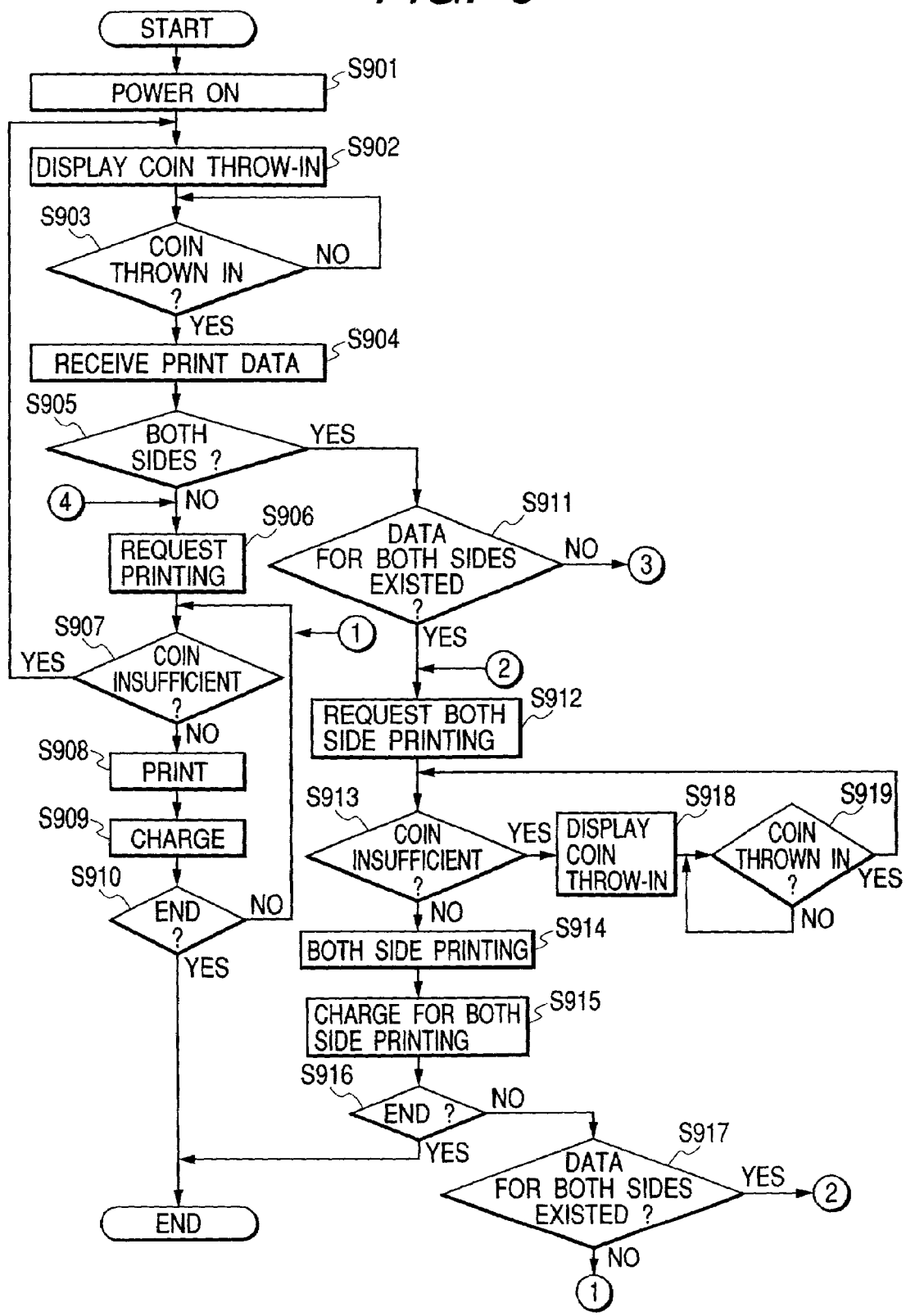
FIG. 9 is a flowchart showing an example of the operation of a charging system in a third embodiment of the invention.

In step S901 in FIG. 9, the ordinary copy activating operation is executed under the control of the core unit 10 at the time of turn-on of a power source. Although an initializing process is executed for the formatter unit 8 (PDL), the control mode is not shifted to a mode in which the PDL (Page Description Language) data from the PC/WS 12 can be received, but is kept in a state where the PDL data is not received by setting the mode into a print standby mode.

The PDL data 600 has the logical structure as shown in FIG. 6. In FIG. 6, reference numeral 601 denotes the header portion showing information regarding the setting of the description language (LIPS), paper size, output mode such as single side/both sides or the like, the number of print copies, and the like. Reference numeral 602 denotes the print data written by the description language shown in the header portion 601. There is also a case where data for a plurality of pages has been written in the data portion 602.

In step S902, the coin throw-in picture plane is displayed to the operation unit 115 at a point when all of the setup operations have been completed.

In step S903, if coins have been thrown into the coin receiving unit 14, step S904 follows. If no coin is thrown in, the processing routine is returned to step S903. In step S903, the number of coins (fee) which is necessary for printing is not discriminated but whether the coins have been thrown in or not is discriminated. This process is performed to discriminate whether the user who intends to print exists near the hybrid apparatus or not. Therefore, if the coins have been thrown in in step S903, it is regarded that the user exists near the apparatus, so that the processes in step S904 and subsequent steps are executed.

In step S904, the core unit 10 receives a notification of the coin throw-in from the coin receiving unit 14 and turns on the print ready signal. In response to this signal, the formatter unit 8 (PDL) is enabled to receive the print data.

In step S905, the PDL data is transferred from the PC/WS 12 to the formatter unit 8 via the computer interface unit 7 and actually developed by the operation of the PC/WS 12 or the operation of the operation unit 115. By interpreting the header portion 601, monochrome/color, paper size, resolution, and single side/both sides are clarified as an output mode. In case of the single-side printing, step S906 follows. In case of the both-side printing, step S911 follows.

In case of the single-side printing, in step S906, the core unit 10 is notified of the output mode (monochrome/color, paper size, resolution, and single-side printing) clarified in step S905.

In step S907, a calculation of a fee necessary for printing the first side is executed by the same method as the charging method of the copy on the basis of the output mode determined in step S905. If an amount of money thrown into the coin receiving unit 14 is sufficient, step S908 follows. If it is insufficient, the processing routine is returned to step S902.

In step S908, the print data is sent from the formatter unit 8 to the core unit 10 and the printing is actually executed. In step S909, an actual charging process such that the fee for the printed originals is subtracted from the fee of money thrown into the coin receiving unit 14 is executed.

In step S910, whether there is a page which is not printed yet in the data developed in step S905 or not is discriminated. If the printing of all pages has been completed, the processing routine is finished. If there is a page to be printed, the processing routine is returned to step S907. The remaining pages are printed in steps S907, S908, and S909.

In case of the both-side printing, whether the data developed in the formatter unit 8 (PDL) is the data for both sides (the first side and the second side) or not is discriminated in step S911. If there is the data for both sides, in step S912, the core unit 10 is notified of the output mode (monochrome/color, paper size, resolution, and both-side printing) which corresponds to a combination of the first and second sides and has been clarified in step S905.

In step S913, a calculation of a fee necessary for printing the first side is executed on the basis of the output mode determined in step S905. If an amount of money thrown into the coin receiving unit 14 is sufficient, step S914 follows. If it is insufficient, the processing routine advances to step S918. The coin throw-in picture plane is displayed in the operation unit 115. If coins are thrown into the coin receiving unit 14 in step S919, the processing routine is returned to step S913.

In step S914, the print data for both sides is sent from the formatter unit 8 to the core unit 10 and the both-side printing is actually executed. In step S915, the actual charging process such that the fee for the printed originals is subtracted from the fee of money thrown into the coin receiving unit 14 or the like is executed.

In step S916, whether there is the non-printed page in the data developed in step S905 or not is discriminated. If the printing for all pages has been completed, the processing routine is finished. If there is a page to be printed, whether the data for both sides which is not printed yet exists or not is discriminated in step S917. If there is the data for both sides, the processing routine is returned to step S9 12 and the both-side printing process is executed. If NO, that is, if there is only the data for a single side, it is determined that the page to be printed is the last page and step S907 follows. The foregoing single-side printing process is executed.

Figure 10:
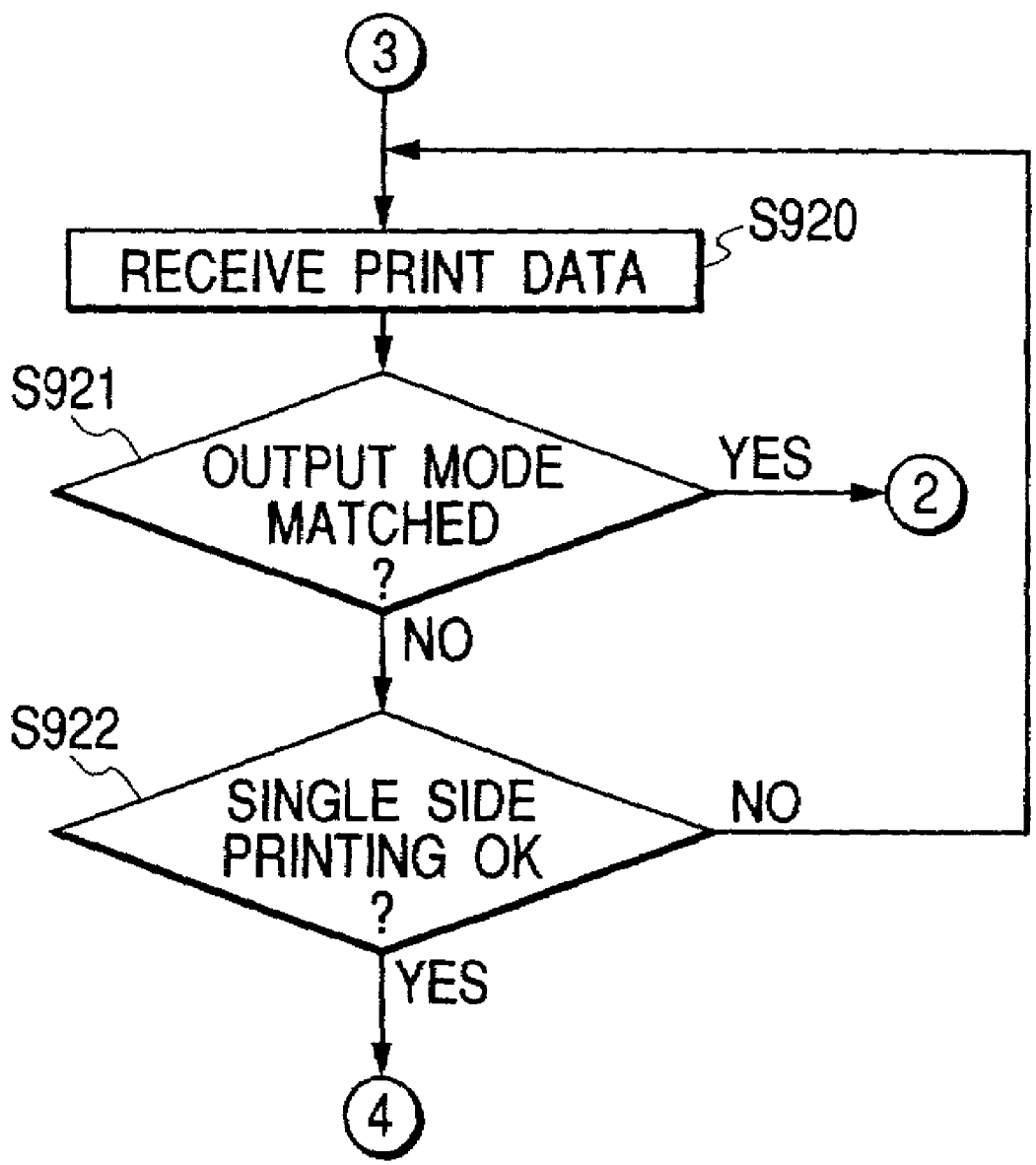
FIG. 10 is a flowchart showing an example of the operation of the charging system in the third embodiment of the invention.

If the data for both sides does not exist in step S911, that is, if the data developed in step S905 is the data only for a single side, in step S920 in FIG. 10, the formatter unit 8 (PDL) is enabled to receive the PDL data in order to receive the data for the second side. When the PDL data is transferred from the PC/WS 12, in step S921, the transferred data is developed in the formatter unit 8 and the header portion 601 of the developed data is interpreted, thereby clarifying the output mode (monochrome/color, paper size, resolution, single side/both sides) is clarified. Whether the output mode coincides with the output mode analyzed in step S905 or not is discriminated. If the output mode coincides as a result of the discrimination, step S912 follows. The core unit 10 is notified of the data of the first side developed in step S905 and the data of the second side developed in step S921 as data for both sides together with the output mode. The both-side printing process in step S913 and subsequent steps are executed.

If the output mode does not coincide in step S921, step S922 follows. In step S922, a message such as "Do you perform single-side printing?" or the like is displayed on the display unit of the operation unit 115, thereby inquiring of the user about whether the data developed in step S905 and the data developed in step S921 can be printed in the single side mode or not. If the single-side printing is instructed by the operation of the operation unit 115, step S906 follows. The processes in step S906 and subsequent steps are executed, thereby setting the item of both sides of the analyzed output mode to "single side" and single-side printing each of the data developed in step S905 and the data developed in step S921.

If the single-side printing is not instructed in step S922, the processing routine is returned to step S920 and the data whose both-side printing has been designated is received again.

According to the embodiment as described above, the copy charging system can be used in the image forming apparatus having the printer function.

Particularly, a load of the user in the both-side printing mode can be reduced. There is no need to execute a complicated process of recovery such that the single-side printing is interrupted due to the insufficient fee in the both-side printing mode.

The invention also incorporates a case where in order to make various devices operative so as to realize the functions of the embodiments mentioned above, program codes of software to realize the functions of the embodiments are supplied to a computer in an apparatus or a system connected to the various devices, and the various devices are operated in accordance with a program stored in a computer (a CPU or an MPU) of the system or apparatus, thereby realizing those functions.

In this case, the program codes themselves of the software realize the functions of the embodiments mentioned above. The program codes themselves and means for supplying the program codes to a computer, for example, a memory medium in which such program codes have been stored construct the invention. As such a memory medium for storing the program codes, for example, it is possible to use a floppy disk, a hard disk, an optical disk, a magneto-optical disk, a CD-ROM, a magnetic tape, a non-volatile memory card, an ROM, or the like.

Naturally, the program codes are incorporated in the embodiments of the invention not only in the case where the computer executes the supplied program codes, thereby realizing the functions of the embodiments mentioned above, but also in the case where the functions of the embodiments mentioned above are realized by the program codes in cooperation with the OS (Operating System) which operates in a computer or with another application software or the like.

Further, the invention also incorporates a case where the supplied program codes are stored into a memory equipped for a function expanding board of a computer or a function expanding unit connected to a computer and, thereafter, a CPU or the like provided for the function expanding board or function expanding unit executes a part or all of the actual processes on the basis of instructions of the program, so that the functions of the embodiments mentioned above are realized by those processes.

As described above, according to the invention, the copy charging system can be also applied to the image processing apparatus having the function for print outputting the data such as PDL data or the like.

The foregoing various effects can be obtained.

What is claimed is:

1. An image forming apparatus comprising:
   a receiving device which receives print data that is to be printed;
   a recognizing device which recognizes whether or not cash has been put into a cash receiving unit irrespective of an amount of cash which is necessary for printing;
   a control device which controls such that when a fact that the cash has been put into the cash receiving unit is recognized by said recognizing device, said receiving device is changed from a state of not receiving the print data to a state of receiving the print data;
   a calculating device which calculates an amount of cash which is necessary for printing the print data received by said receiving device based on the print data received by said receiving device; and
   a printing device which prints the print data received by said receiving device in accordance with the amount of cash calculated by said calculating device and the amount of cash put into the cash receiving unit.

2. An apparatus according to claim 1, wherein said printing device interrupts the printing of the print data in accordance with the amount of cash calculated by said calculating device and the amount of cash put into the cash receiving unit.

3. An apparatus according to claim 2, wherein said printing device restarts the interrupted printing in accordance with the amount of cash calculated by said calculating device and the amount of put into the cash receiving unit cash.

4. An apparatus according to claim 1, wherein said calculating device performs the calculation on the basis of information added to the print data received by said receiving device.

5. An apparatus according to claim 4, wherein the information includes at least one of information indicating a monochromatic output or a color output, information indicating a size of paper on which the print data is to be printed, information indicating a resolution at which the print data is to be printed, and information indicating a single-side print or a both-side print.

6. An apparatus according to claim 1, wherein said printing device prints the print data page by page.

7. An image forming apparatus comprising:
a receiving device which receives print data of a plurality of pages in a lump;
a recognizing device which recognizes an amount of money paid by cash put into a cash receiving unit;
a calculating device which calculates an amount of money necessary for printing the print data received by said receiving device;
a comparing device which compares a remaining amount of the cash put into the cash receiving unit with the amount of money necessary for printing one sheet, every one sheet being printed based on the print data received for a plurality of sheets by said receiving device; and
an interrupting device which interrupts the printing of the print data in accordance with a result of the comparison by said comparing device during printing of the plurality of sheets.

8. A control method for an image forming apparatus, comprising:
a receiving step of receiving print data that is to be printed;
a recognizing step of recognizing whether or not cash has been put into a cash receiving unit irrespective of an amount of cash which is necessary for printing;
a control step of controlling such that when a fact that the cash has been put into the cash receiving unit is recognized in said recognizing step, the reception of the print data in said receiving step is changed from a state of not receiving the print data to a state of receiving the print data;
a calculating step of calculating an amount of cash which is necessary for printing the print data received in said receiving step based on the print data received in said receiving step; and
a printing step of printing the print data received in said receiving step in accordance with the amount of cash calculated in said calculating step and the amount of cash put into the cash receiving unit.

9. A control method for an image forming apparatus, comprising:
a receiving step of receiving print data of a plurality of pages in a lump;
a recognizing step of recognizing an amount of money paid by cash put into a cash receiving unit;
a calculating step of calculating an amount of money necessary for printing the print data received in said receiving step;
a comparing step of comparing a remaining amount of the cash put into the cash receiving unit with the amount of money necessary for printing one sheet, every one sheet being printed based on the print data received for a plurality of sheets in said receiving step; and
an interrupting step of interrupting the printing of the print data in accordance with a result of the comparison in said comparing step during printing of the plurality of sheets.

10. A memory medium which stores a program for executing a control method for an image forming apparatus, wherein said program comprises:
a receiving step of receiving print data that is to be printed;
a recognizing step of recognizing whether or not cash has been put into a cash receiving unit irrespective of an amount of cash which is necessary for printing;
a control step of controlling such that when a fact that the cash has been put into the cash receiving unit is recognized in said recognizing step, the reception of the print data in said receiving step is changed from a state of not receiving the print data to a state of receiving the print data;
a calculating step of calculating an amount of cash which is necessary for printing the print data received in said receiving step based on the print data received in said receiving step; and
a printing step of printing the print data received in said receiving step in accordance with the amount of cash calculated in said calculating step and the amount of cash put into the cash receiving unit.

11. A memory medium which stores a program for executing a control method for an image forming apparatus, wherein said program comprises:
a receiving step of receiving print data of a plurality of pages in a lump;
a recognizing step of recognizing an amount of money paid by cash put into a cash receiving unit;
a calculating step of calculating an amount of money necessary for printing the print data received in said receiving step;
a comparing step of comparing a remaining amount of the cash put into the cash receiving unit with the amount of money necessary for printing one sheet, every one sheet being printed based on the print data received for a plurality of sheets in said receiving step; and
an interrupting step of interrupting the printing of the print data in accordance with a result of the comparison in said comparing step during printing of the plurality of sheets.

12. A program stored on a computer-readable medium for executing a control method for an image forming apparatus, the program comprising:
code of a receiving step of receiving print data that is to be printed;
code of a recognizing step of recognizing whether or not cash has been put into a cash receiving unit irrespective of an amount of cash which is necessary for printing;
code of a control step of controlling such that when a fact that the cash has been put into the cash receiving unit is recognized in said recognizing step, the reception of the print data in said receiving step is changed from a state of not receiving the print data to a state of receiving the print data;
code of a calculating step of calculating an amount of cash which is necessary for printing the print data received in said receiving step based on the print data received in said receiving step; and
code of a printing step of printing the print data received in said receiving step in accordance with the amount of cash calculated in said calculating step and the amount of cash put into the cash receiving unit.

13. A program stored on a computer-readable medium for executing a control method for an image forming apparatus, the program comprising:
code of a receiving step of receiving print data of a plurality of pages in a lump;
code of a recognizing step of recognizing an amount of money paid by cash put into a cash receiving unit;
code of a calculating step of calculating an amount of money necessary for printing the print data received in said receiving step;

code of a comparing step of comparing a remaining amount of the cash put into the cash receiving unit with the amount of money necessary for printing one sheet, every one sheet being printed based on the print data received for a plurality of sheets in said receiving step; and code of an interrupting step of interrupting the printing of the print data in accordance with a result of the comparison in said comparing step during printing of the plurality of sheets.

* * * * *

UNITED STATES PATENT AND TRADEMARK OFFICE
CERTIFICATE OF CORRECTION

| | | |
|---|---|---|
| PATENT NO. | : 7,190,484 B2 | |
| APPLICATION NO. | : 09/793097 | |
| DATED | : March 13, 2007 | |
| INVENTOR(S) | : Sugino | |

It is certified that error appears in the above-identified patent and that said Letters Patent is hereby corrected as shown below:

ON THE TITLE PAGE:
At Item (54), "CASH OPERATED" should read --CASH-OPERATED--.

COLUMN 1:
Line 1, "CASH OPERATED" should read --CASH-OPERATED--.

COLUMN 2:
Line 11, "coins" should read --coins into the apparatus--.

COLUMN 3:
Line 63, "hereinlater," should read --hereinafter,--.

COLUMN 4:
Line 57, "flapper 209 50" should read --flapper 209 so--.

COLUMN 5:
Line 55, "flow" should read --flowchart--.
Line 61, "hereinlater." should read --hereinafter.--.

COLUMN 8:
Line 25, "is the page" should read --are still pages--.

COLUMN 10:
Line 39, "is a page" should read --are still pages--.

COLUMN 11:
Line 4, "stop S9 12" should read --step S912--.
Line 18, "sides) is clarified." should read --sides).--.
Line 38, "ing" should read --ing of--.

UNITED STATES PATENT AND TRADEMARK OFFICE
CERTIFICATE OF CORRECTION

PATENT NO. : 7,190,484 B2
APPLICATION NO. : 09/793097
DATED : March 13, 2007
INVENTOR(S) : Sugino It is certified that error appears in the above-identified patent and that said Letters Patent is hereby corrected as shown below:

COLUMN 12:
Line 55, claim 3 "of" should read --of cash--, and "unit" should read --unit.--.
Line 56, claim 3 "cash." should be deleted.

Signed and Sealed this

Tenth Day of March, 2009

JOHN DOLL
*Acting Director of the United States Patent and Trademark Office*